Oct. 14, 1924.  1,511,406
J. FRANKENBERG
AUTOMATIC PRESSURE CONTROLLING APPARATUS
Filed Sept. 1, 1920  2 Sheets-Sheet 1

Witness:
Dave S. Magnusson

Inventor:
Julius Frankenberg
By Chas. C. Tillman
Atty.

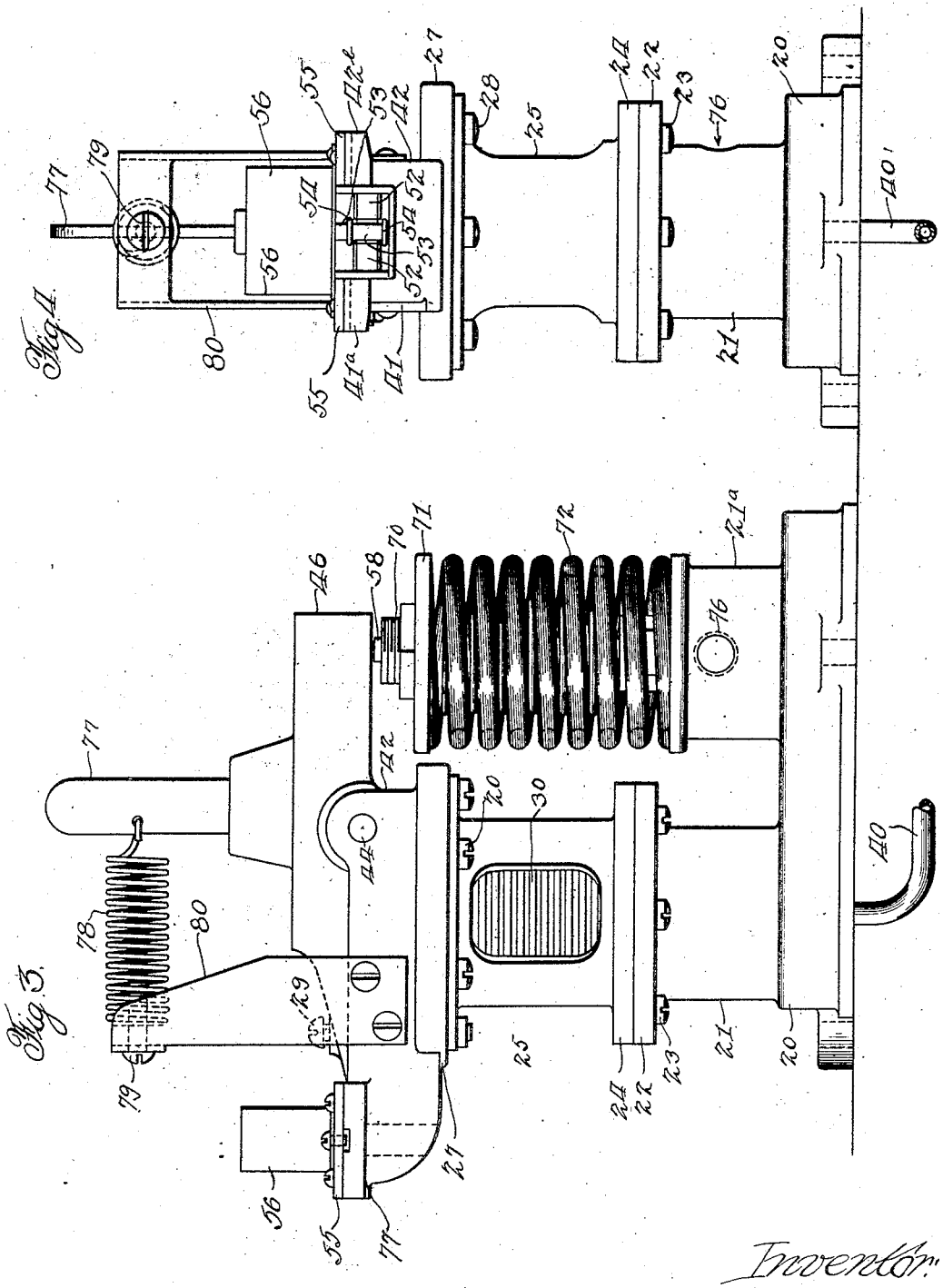

Patented Oct. 14, 1924.

1,511,406

UNITED STATES PATENT OFFICE.

JULIUS FRANKENBERG, OF CHICAGO, ILLINOIS.

AUTOMATIC PRESSURE-CONTROLLING APPARATUS.

Application filed September 1, 1920. Serial No. 407,472.

*To all whom it may concern:*

Be it known that I, JULIUS FRANKENBERG, a citizen of the United States, residing at the city of Chicago, in the county of Cook and State of Illinois, have invented certain new and useful Improvements in an Automatic Pressure-Controlling Apparatus, of which the following is a specification.

This invention relates to improvements in an automatic pressure control, to be used for any purpose or in connection with any kind of apparatus to which it may be found applicable, but particularly for the control of the pressure of water cooled condensers for and in connection with domestic refrigerating apparatus, using sulphur dioxide or any other kindred refrigerant.

The invention consists in certain peculiarities of the construction, novel arrangement, combination and operation of the various parts thereof, hereafter fully set forth and specifically claimed.

The principal object of this invention is to provide an automatic pressure control primarily intended for domestic refrigerating apparatus using sulphur dioxide or any other kindred refrigerant. One which by reason of its ruggedness and simplicity of design will permanently maintain proper relation between the various operative parts and on account of its sensitiveness will keep the condenser pressure constant within close and reasonable limits. One in which the stuffing box of the water supply valve, ordinarily used, has been substituted by a simple mechanism, whereby elimination is effected of the troubles inherent in packed valves, which have proven in most all such cases fatal to the accuracy of operation of such devices. One which provides for an electric switch which automatically stops the electric motor driving the refrigerating machine in case the water supply for the condenser is cut off or the condenser pressure thereby has exceeded the normal pressure of a predetermined amount, and one which will again automatically start the electric motor when water has been supplied to the condenser. Other advantages not enumerated will be hereinafter referred to in the specification.

In the accompanying drawings, which serve to illustrate an embodiment of the invention—

Fig. 3 is a side elevation and Fig. 4 is an elevation of the device looking toward the switch end of the same.

Corresponding numerals of reference refer to like parts throughout the different views of the drawings.

Figure 2:
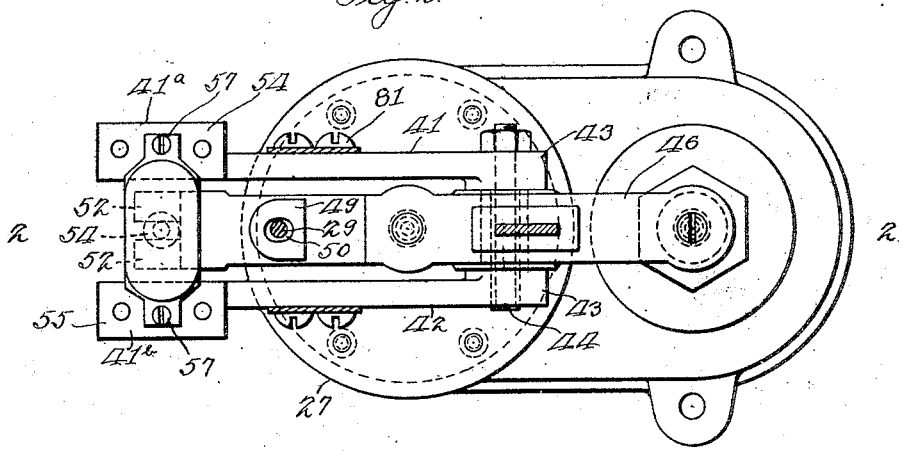
Fig. 2 is a plan view thereof.

This pressure control may be operated in any position, but the horizontal one, as shown in the drawings, is preferable. The apparatus is mounted upon an oblong base 20 which has the vertical extensions 21 and 21ª, both of circular cross section and spaced apart a predetermined amount, as will be shown further on. Upon the flange 22 of the extension 21 and concentric with the same is bolted the circular housing 25 by means of circular flanges 24 and bolts 23 and within said housing is located a corrugated circular or bellows diaphragm 30 the axis of which coincides with the axis of the housings 21 and 25. The lower head 31 of the diaphragm 30 is provided with the threaded end 33 which projects through the lower head 36 of the housing 25 and is securely fastened to the same by means of the nut 34. Permanent communication between the gas space of the condenser and the interior space of the diaphragm 30 is had by means of the pipe 40 which is suitably attached to said condenser and to the threaded end 33 of the diaphragm 30, also by means of the ports 37 in the projection 33, and the port 39 of the guide 38 of the diaphragm. To the upper flange 26 of the diaphragm housing 25 is bolted by means of the bolts 28 the recessed circular head 27, said head having the vertical extensions 41 and 42 disposed symmetrically to both sides of the center line 2—2 of the apparatus, and said extensions provided with the bosses 43 for the reception of the fulcrum pin 44 on which is mounted the fulcrum lever 46.

Figure 1:
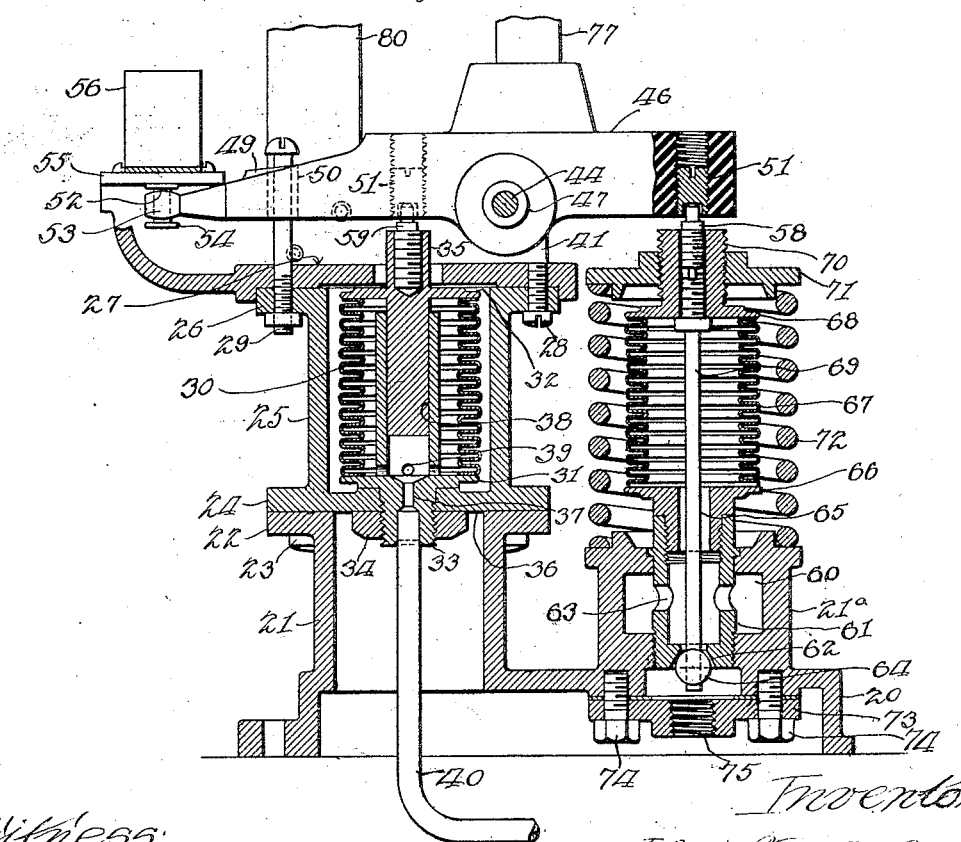
Fig. 1 is a central vertical longitudinal sectional view of the apparatus.

As shown in Fig. 1 the hollow water valve body 61 is secured into the lower head of the extension 21ª and is concentrically located therein, both forming the annular space 60. The lower end of the water valve body 61 has the conical valve seat 62, while into the upper end is screwed the lower head 66 of a bellows diaphragm 67. The upper head 68 of the diaphragm 67 and its extension 70 is threaded for the reception of the water valve stem 69 and pivoting pin 58, said water valve stem 69 extending through the diaphragm 67 and water valve body and terminating in the ball valve 64. Normally this ball valve is held tight against its conical seat 62 by means of the compression spring 72 which is concentrically located upon the extension 21ª, embracing the diaphragm 67, and the tension of said spring is regulated by the spring plate 71, the same being located upon the threaded projection 70 of the upper head of the diaphragm 67. Below the ball valve 64 the flange 73 is bolted water tight to the under side of the base 20 by means of the bolts 74 and said flange is provided with the tapped hole 75 for the reception of the water inlet pipe connected with a suitable water supply source. Communication is established between said water supply and the condenser surfaces to be cooled by means of the ports 63 of the water valve body 61, the annular space 60 of the extension 21ª and the tapped hole 76 shown in Figs. 3 and 4, into which is screwed a pipe leading to the condenser, not shown.

The fulcrum lever 46 operatively engages the stem 53 of the electrical pull and push switch 56 by means of the forked cam shaped ends 52 of said lever and the two flanges 54 of the stem 53. The switch is bolted to the lateral extensions 41ª and 42ᵇ of 41 and 42 by means of the bolts 57 as shown in Figs. 2, 3 and 4, but the fibre strips 55 are interposed to insulate the switch from the entire apparatus. For similar reasons the fulcrum lever 46 is made of fibrous insulating material.

As shown in the drawings especially in Fig. 1, both the diaphragms 30 and 67 are pivotally and operatively connected with the fulcrum lever 46 by the diaphragm pivoting screws 58 and 59 these screws forming contact points with the metal plugs 51 which are screwed into said fulcrum lever. The stroke of the diaphragm 30 is limited by the head of the bolt 29 extending through the hole 50 of the lever 46 and the flat portion 49 of the same, while the stroke of the diaphragm 67 is limited by the ball valve 64. For reasons hereafter explained I have placed a suitable distance above the fulcrum lever 46 the horizontal tension spring 78 as shown in Fig. 3, connected to the lever arm 77 forming part of the fulcrum lever and disposed to the same at right angles. The tension of this spring may be varied by means of the screw 79 operating in the post 80 which is bolted to the ribs 41 and 42 by means of bolts 81.

The operation of the device is as follows:
As shown in Fig. 1 the fulcrum lever 46 is in its mid position and the ball valve 64 off its seat 62 admitting water to the condenser. If the quantity of water is momentarily too large, the condenser pressure will drop below its predetermined point and the combined tensions of the springs 72 and 78 will force down the pressure diaphragm 30 and the push rod 53 of the switch 56, by turning the fulcrum lever 46 about the fulcrum pin 44, and at the same time the ball valve 64 will approach its seat 62, until the proper flow of water is established.

Similar reasoning may be applied if the condenser pressure should exceed the predetermined point, as in that case, the pressure diaphragm 30 will overcome the combined tensions of the springs 72 and 78, thus increasing the water valve opening, and since the fulcrum lever is turned about the fulcrum pin 44, the push rod 53 of the switch 56 is moved upwards thereby. If for any reason the water supply is entirely cut off, the condenser pressure will continue to increase, until the flat portion 49 of the fulcrum lever 46 gets in contact with the under side of the bolt head of the bolt 29. At that instant the forked end 52 of the fulcrum lever will be at its highest position, throwing out the switch and thus stopping the motor driving the refrigerating machine. When water is again admitted, the condenser pressure will drop to such a point, where the push rod 53 will reach its lowest position, thereby throwing in the switch 56 and again starting the aforesaid motor.

It is evident that the type of electrical switch, shown in the drawings, may be substituted by similar types and I therefore do not wish to limit myself to any particular type of switch. It is also evident that the device may be operated with the spring 72 alone, but by adding the auxiliary spring 78, I have obtained greater accuracy of operation and have eliminated chattering of the water valve, which will take place at times when the spring 72 only is used.

Where pure water is available for condensing purposes, it is possible to use a stuffing box, instead of the diaphragm 67, although any tightening of said stuffing box required from time to time would involve a readjustment of the entire apparatus, and furthermore, the danger of the water valve stem sticking would always be present. However, I desire to have the above modification come under the scope of my invention.

Having thus fully described my invention, what I claim as new and desire to secure by Letters Patent is—

1. In a device of the class described, the combination of a pressure diaphragm of the bellows type fixedly supported at one of its ends and at its other end free to move in the direction of its axis, said diaphragm being subject to the pressure of a condenser, with a water valve casing mounted near said diaphragm and having an inlet and an outlet, a hollow valve body located in said casing in communication therewith and provided with a valve seat, a diaphragm of the bellows type fixed at one end to and in communication with said body, the other end of the last named diaphragm being free to move in the direction of its axis and having an axial extension thereon, a valve rod carried by the movable end of the last named diaphragm and provided with a valve to co-act with said valve seat, a member adjustably mounted on said axial extension, a helical spring interposed between said member and the valve casing, a lever transversely disposed with respect to said diaphragms and fulcrumed between the axes thereof near their movable ends, connections uniting the diaphragms and lever on opposite sides of its fulcrum, and an electric switch operatively engaged by said lever.

2. In a device of the class described, the combination with a pressure diaphragm subject to the pressure of a condenser, of a packless water valve including a water diaphragm mounted thereon and forming a part of said valve, a lever pivotally mounted between the axes of said diaphragms and operatively connected with the same, an electric switch operatively engaged by said lever, means for counter-balancing the water valve and said switch against the moving force of the pressure diaphragm, metal plugs adjustably mounted in said lever, and pivots mounted on the diaphragms in contact with said plugs.

3. In a device of the class described, the combination with a pressure diaphragm subject to the pressure of a condenser, of a packless water valve including a water diaphragm mounted thereon and forming a part of said valve, a lever pivotally mounted between the axes of said diaphragms and operatively connected with the same, an electric switch operatively engaged by said lever, means for counter-balancing the water valve and said switch against the moving force of the pressure diaphragm, metal plugs adjustably mounted in said lever, pivots mounted on the diaphragms in contact with said plugs, and means for limiting the movement of said lever.

4. In a device of the class described, the combination with a pressure diaphragm subject to the pressure of a condenser, of a packless water valve including a water diaphragm mounted thereon and forming a part of said valve, a lever pivotally mounted between the axes of said diaphragms and operatively connected with the same, an electric switch operatively engaged by said lever, means for counter-balancing the water valve and said switch against the moving force of the pressure diaphragm, metal plugs mounted in said lever, adjustable pivots mounted on the diaphragms in contact with said plugs, and means for limiting the movement of said lever.

5. In a device of the class described, the combination with a bellows diaphragm subjected to the condenser pressure of a refrigerating apparatus, a packless water valve connected to a water supply and in communication with said condenser surfaces to be cooled, said water valve made without a stuffing box or packless by means of a second bellows diaphragm, said diaphragms mounted upon a base containing the water valve body at a predetermined distance from each other, a fulcrum lever located above but in the plane of the axes of said diaphragms, said lever pivoted to said base, a predetermined distance between said diaphragms, adjustable means connecting the upper portions of said diaphragms and fulcrum lever, a helical spring totally encompassing the diaphragm of the water valve, a water valve stem fixed to the upper portion of its diaphragm and the water valve held tight normally against its seat by said helical spring, means provided for the helical spring to have such compression as to counterbalance the pressure exerted by the pressure diaphragm, an electric switch mounted upon a vertical projection of the base, said switch serially connected to a circuit of an electric motor for driving the refrigerating machine and positively actuated by said fulcrum lever for the purpose of opening or closing said electric circuit, and means of limiting the oscillation of said lever to cut said switch in or out as required.

6. In a device of the class described, the combination with a pressure diaphragm subject to the pressure of a condenser, of a water valve including a water diaphragm mounted thereon and including a part of the valve, a lever pivoted between the axes of said diaphragms, adjustable members connected with said diaphragms adapted to engage with said lever to operate the same, means for limiting the movement of said lever, and a switch to be actuated by the movements of said lever.

7. In a device of the class described, the combination with a pressure diaphragm subject to pressure of a condenser, of a water valve including a water diaphragm mounted thereon and forming part of said valve, a lever pivoted between the axes of said diaphragms and adapted to be rocked by the latter, adjusting means associated between said lever and said diaphragms whereby the degree of movement of said lever by said diaphragms may be controlled, and an electric switch operated by movement of said lever.

JULIUS FRANKENBERG.